US012333776B2

(12) United States Patent
Jawahar et al.

(10) Patent No.: US 12,333,776 B2
(45) Date of Patent: Jun. 17, 2025

(54) SYSTEM AND METHOD FOR GENERATING AN OPTIMIZED IMAGE WITH SCRIBBLE-BASED ANNOTATION OF IMAGES USING A MACHINE LEARNING MODEL

(71) Applicants: International Institute of Information Technology, Hyderabad, Hyderabad (IN); Indian Institute of Technology, Delhi, New Delhi (IN)

(72) Inventors: C. V. Jawahar, Hyderabad (IN); Bhavani Sambaturu, Hyderabad (IN); Ashutosh Gupta, New Delhi (IN); Chetan Arora, Hari Nagar (IN)

( * ) Notice: Subject to any disclaimer, the term of this patent is extended or adjusted under 35 U.S.C. 154(b) by 624 days.

(21) Appl. No.: 17/684,242

(22) Filed: Mar. 1, 2022

(65) Prior Publication Data

US 2022/0277540 A1 Sep. 1, 2022

(30) Foreign Application Priority Data

Mar. 1, 2021 (IN) .............................. 202141008605

(51) Int. Cl.
*G06K 9/00* (2022.01)
*G06N 20/00* (2019.01)
*G06V 10/26* (2022.01)
*G06V 10/764* (2022.01)
*G06V 20/70* (2022.01)

(52) U.S. Cl.
CPC ............. *G06V 10/26* (2022.01); *G06N 20/00* (2019.01); *G06V 10/764* (2022.01); *G06V 20/70* (2022.01)

(58) Field of Classification Search
CPC ...... G06V 10/26; G06V 10/764; G06V 20/70; G06V 10/774; G06V 10/82; G06V 10/945; G06N 20/00; G06N 3/084; G06T 7/10; G06T 2200/24; G06T 2207/20081; G06T 2207/20101; G06T 2207/20104; G06T 7/11
USPC ....................................................... 382/100
See application file for complete search history.

(56) References Cited

U.S. PATENT DOCUMENTS 12,046,356 B2 * 7/2024 Jawahar .................... G06T 7/10
2020/0057487 A1 * 2/2020 Sicconi .................. G06F 3/011

* cited by examiner

*Primary Examiner* — Duy M Dang (57) ABSTRACT

A system and method for generating an optimized image with scribble-based interactive image segmentation model using a machine learning are provided. The method includes, (i) segmenting, using a machine learning model, an image to classify into classes each class is represented with a label, (ii) displaying the classified image which specifies the classes on the classified image with outlines, (iii) enabling a user to scribble on the classified image to annotate the classes if an area is not classified, (iv) assigning a color mask for each scribbled area, (v) computing, using the machine learning model, a loss function for a location of pixels based on color mask, (vi) modifying pre-defined weights for each scribbled area to match the annotated image and a determined class on the classified image, and (vii) generating the optimized image if the annotated image is matched with the determined class on the classified image.

17 Claims, 7 Drawing Sheets

SYSTEM AND METHOD FOR GENERATING AN OPTIMIZED IMAGE WITH SCRIBBLE-BASED ANNOTATION OF IMAGES USING A MACHINE LEARNING MODEL

CROSS-REFERENCE TO PRIOR-FILED PATENT APPLICATIONS

This application claims priority from the Indian provisional application no. 202141008605 filed on Mar. 1, 2021, which is herein incorporated by reference.

TECHNICAL FIELD

The embodiments herein generally relate to image segmentation, and more particularly, to a system and method for generating a scribble-based annotation of images for segmentation using a machine learning model.

DESCRIPTION OF THE RELATED ART

Semantic segmentation is a significant tool for image recognition and scene understanding. It offers a great deal of support for understanding scenes that frequently vary in appearance and pose. Scene understanding is very important as it can be employed to assess scene geometry and object support relationships, as well. It also has a wide range of applications, varying from autonomous driving to robotic interaction.

Existing semantic segmentation methods lack performance, especially due to two factors. The two factors are the availability of limited data in terms of volume and diversity, and inter-annotator agreement due to which it is difficult to train a semantic segmentation method that works consistently and efficiently in all the scenarios. The data may be a huge dataset of images. Sometimes, the collected datasets do not contain all the possible variations. However, the current interactive segmentation methods typically annotate one object at a time by considering the object under consideration as foreground and the rest of the image as a background. Owing to this, the images that include several objects and images captured in the uncontrolled environment may take more time for annotation, and thereby the overall annotation time of the image may be high. Moreover, the existing semi-automated methods require a joint training using both the images as well as user inputs. This again may lead to a deterioration in performance when a new annotator who had not provided user inputs during training the interactive segmentation system tries to annotate the image. The reported interactive segmentation approaches typically work with only one type of user input, i.e., a point, a rectangular or square-shaped box, or scribble which limits its ability to annotate objects of varying or irregular shapes.

Some other existing interactive segmentation methods annotate an instance of an object to segment noisy images using a shape-based regularization. The final segmentation is done by taking anchor points to refine the boundary of the object under consideration. The method is applicable only for segmenting a single object against its background. The existing interactive segmentation methods may lack advanced segmentation settings, especially the ability of correction of labels, insertion of labels, correction of labels unseen during training, ability to use any type of user inputs such as points, boxes, and scribbles, etc.

Some other existing interactive segmentation methods may not be able to annotate data from videos.

Accordingly, there remains a need for a more efficient system and method for mitigating and/or overcoming drawbacks associated with current methods.

SUMMARY

In a view of the foregoing, an embodiment herein provides a processor-implemented method for generating an optimized image with scribble-based annotation using a machine learning model. The method includes segmenting, using the machine learning model, a received image from at least one of a cloud, or a user device to obtain a classified image using one or more classes. In some embodiments, each class is represented with a label. In some embodiments, the one or more classes are obtained based on pre-defined weights of the classified image. The method includes displaying, using a graphical user interface, the classified image which specifies the one or more classes on the classified image with outlines. In some embodiments, the outlines on the classified image are generated by the machine learning model. The method includes enabling a user to mark or scribble on the classified image to annotate the one or more classes if an area on the classified image is not classified into at least one of the one or more classes. The method includes assigning, using the machine learning model, a color mask for each scribbled area after receiving the annotated image that is marked or scribbled by the user. The method includes computing, using the machine learning model, a loss function for a location of pixels based on the color mask assigned on the annotated image. In some embodiments, the loss function identifies whether the classified image matches with the received marking or the scribbling at scribble locations on the classified image. The method includes modifying, using the machine learning model, the pre-defined weights for each scribbled area to match the annotated image and a determined class on the classified image using the loss function by a learning rate. In some embodiments, the learning rate determines a speed of change of the weight. The method includes determining, using the machine learning model, whether the annotated image is matched with the determined class on the classified image. The method includes generating the optimized image if the annotated image is matched with the determined class on the classified image.

In some embodiments, the received image is segmented into the one or more classes by, (i) extracting, using an encoder, the received image into at least one feature map to capture one or more features, the one or more features are captured using filters; (ii) recovering, using a decoder, a resolution of the at least one feature map to obtain the one or more classes.

In some embodiments, the outlines that are generated on each class of the classified image are validated using the machine learning model through the graphical user interface In some embodiments, the marking or the scribbling over a missed-out area of the classified input is received from an initial outlined class through the graphical user interface In some embodiments, the marking or the scribbling over the missed-out area of one or more classes is received from the optimized image using the graphical user interface and the optimized image is again optimized based on the received scribblings and markings.

In some embodiments, the method further includes, (a) providing optimized images and corresponding (i) weight of each class and (ii) markings and scribblings to the machine learning model as an input data; (b) training the machine learning model using the input data to generate a trained machine learning model to generate the optimized image In some embodiments, the method includes incorporating the received scribblings or markings when at least one of (i) each label of the one or more classes is changed, (ii) a subset of pixels in an area is incorrect, (iii) when the class is correct and an assigned label is incorrect, or (iv) all the labels in the classified image are missed.

In some embodiments, the method includes modifying the pre-defined weights assigned for each scribbled area based on the loss function using a backpropagation technique. In some embodiments, the gradients are computed for the loss function.

In one aspect, one or more non-transitory computer-readable storage medium store the one or more sequence of instructions, which when executed by a processor, further causes a method for generating an optimized image with scribble-based annotation using a machine learning model. The method includes segmenting, using the machine learning model, a received image from at least one of a cloud, or a user device to obtain a classified image using one or more classes. In some embodiments, each class is represented with a label. In some embodiments, the one or more classes are obtained based on pre-defined weights of the classified image. The method includes displaying, using a graphical user interface, the classified image which specifies the one or more classes on the classified image with outlines. In some embodiments, the outlines on the classified image are generated by the machine learning model. The method includes enabling a user to mark or scribble on the classified image to annotate the one or more classes if an area on the classified image is not classified into at least one of the one or more classes. The method includes assigning, using the machine learning model, a color mask for each scribbled area after receiving the annotated image that is marked or scribbled by the user. The method includes computing, using the machine learning model, a loss function for a location of pixels based on the color mask assigned on the annotated image. In some embodiments, the loss function identifies whether the classified image matches with the received marking or the scribbling at scribble locations on the classified image. The method includes modifying, using the machine learning model, the pre-defined weights for each scribbled area to match the annotated image and a determined class on the classified image using the loss function by a learning rate. In some embodiments, the learning rate determines a speed of change of the weight. The method includes determining, using the machine learning model, whether the annotated image is matched with the determined class on the classified image. The method includes generating the optimized image if the annotated image is matched with the determined class on the classified image.

In another aspect, a system for generating an optimized image with scribble-based annotation using a machine learning model is provided. The system includes a memory that stores a database and a set of instructions and a processor in communication with the memory, the processor retrieving executing machine-readable program instructions from the memory which, when executed by the processor, enable the processor to (i) segment, using the machine learning model, a received image from at least one of a cloud, or a user device to obtain a classified image using one or more classes, each class is represented with a label, the one or more classes are obtained based on pre-defined weights of the classified image; (ii) display, using a graphical user interface, the classified image which specifies the one or more classes on the classified image with outlines, the outlines on the classified image are generated by the machine learning model; (iii) enable a user to mark or scribble on the classified image to annotate the one or more classes if an area on the classified image is not classified into at least one of the one or more classes; (iv) assign, using the machine learning model, a color mask for each scribbled area after receiving the annotated image that is marked or scribbled by the user, a weight is assigned to each scribbled area; (v) compute, using the machine learning model, a loss function for a location of pixels based on the color mask located on the annotated image, the loss function identifies whether the classified image matches with the received marking or the scribbling at scribble locations on the classified image; (vi) modify, using the machine learning model, the weight for each scribbled area to match the annotated image and a determined class on the classified image using the loss function with respect to the weight assigned to each scribbled area by a learning rate, the learning rate determines a speed of change of the weight; (vii) determine, using the machine learning model, whether the annotated image is matched with the determined class on the classified image; and (vii) generate the optimized image if the annotated image is matched with the determined class on the classified image.

In some embodiments, the received image is segmented into the one or more classes by, (i) extracting, using an encoder, the received image into at least one feature map to capture one or more features, the one or more features are captured using filters; (ii) recovering, using a decoder, a resolution of the at least one feature map to obtain the one or more classes.

In some embodiments, the outlines that are generated on each class of the classified image are validated using the machine learning model through the graphical user interface In some embodiments, the marking or the scribbling over a missed-out area of the classified input is received from an initial outlined class through the graphical user interface In some embodiments, the marking or the scribbling over the missed-out area of one or more classes is received from the optimized image using the graphical user interface and the optimized image is again optimized based on the received scribblings and markings.

In some embodiments, the method further includes, (a) providing optimized images and corresponding (i) weight of each class and (ii) markings and scribblings to the machine learning model as an input data; (b) training the machine learning model using the input data to generate a trained machine learning model to generate the optimized image.

In some embodiments, the method includes incorporating the received scribblings or markings when at least one of (i) each label of the one or more classes is changed, (ii) a subset of pixels in an area is incorrect, (iii) when the class is correct and an assigned label is incorrect, or (iv) all the labels in the classified image are missed.

In some embodiments, the method includes modifying the pre-defined weights assigned for each scribbled area based on the loss function using a backpropagation technique. In some embodiments, the gradients are computed for the loss function.

The system and method of a scribble-based smart interactive segmentation model for annotation of images using machine learning provide efficient results than existing systems using human or domain expert interaction to obtain more accurate results. This system helps in reducing the human effort of annotators during reviewing the images with precise identification and detection of target element using any fully automated deep learning-based image segmentation. The system and method can work with any type of user input due to which we can seamlessly annotate objects in an image irrespective of their shape. Also, the system and the method can convert any state-of-the-art semantic segmentation method into an interactive segmentation method. Due to this, the system and the method exploit continuously improving segmentation approaches in a plug-and-play fashion by replacing the current segmentation method with a new segmentation approach. The system and method can work with any type of user input due to which we can seamlessly annotate objects in an image irrespective of their shape.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and method for generating a scribble-based interactive annotation using a machine learning model. Referring now to the drawings, and more particularly to FIG. 1 through FIG. 6, where similar reference characters denote corresponding features consistently throughout the figures, preferred embodiments are shown.

Figure 1:
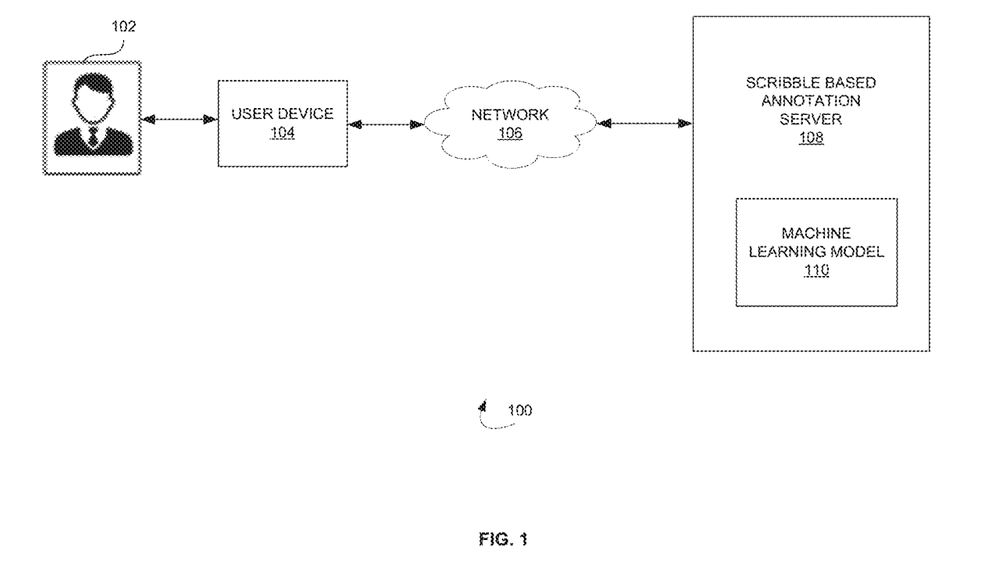
FIG. 1 is a block diagram that illustrates a system for generating an optimized image with scribble-based annotation using a machine learning model, according to some embodiments herein.

FIG. 1 is a block diagram that illustrates a system 100 for generating an optimized image with scribble-based annotation using a machine learning model 110 according to some embodiments herein. The system 100 includes a user 102, a user device 104, a scribble-based annotation server 108, and a machine learning model 110. The user device 104 receives one or more images as input from the user 102. In some embodiments, the user device 104, but not limited to a mobile phone, a tablet, a personal computer, or a laptop. The scribble-based annotation server 108 includes a device processor and a non-transitory computer-readable storage medium storing one or more sequences of instructions, which when executed by the device processor causes the processing of a scribble-based image segmentation. The scribble-based annotation server 108 receives the one or more images through a network 106. In some embodiments, the network 106 is a wireless network or a wired network. In some embodiments, the system 100 may be incorporated on a local machine. The received image may be, without limitation, images or videos collected in diverse conditions, images with traffic elements, images of road pavement, images of pedestrians, images of cars, images of signs, images of traffic lights, etc.

The scribble-based annotation server 108 segments the received image from at least one of a cloud, or a user device 104 to obtain a classified image using one or more classes. In some embodiments, the one or more classes include one or more, but not limited to, some objects may be a road pavement, pedestrians, cars, signs, traffic lights. Each class is represented with a label. The label of each class may be road pavement, pedestrians, cars, signs, traffic lights. In some embodiments, the one or more classes are obtained based on pre-defined weights of the classified image.

In some embodiments, the machine learning model 110 includes an encoder, and a decoder. The encoder extracts one or more feature maps of the received image. The one or more feature maps capture one or more features in the received image using filters at various layers. The decoder recovers a resolution of the one or more feature maps. The feature maps are then used to obtain the classified image showing the one or more classes present. In some embodiments, the one or more feature maps are classified into one or more classes using the machine learning model 110.

The scribble-based annotation server 108 displays the classified image which specifies the one or more classes on the classified image with outlines through a graphical user interface associated with the user device 104. The classified image is generated by the machine learning model 110 that generates outlines on the one or more classes. The scribble-based annotation server 108 enables the user 102 to mark or scribble on the classified image to annotate the one or more classes if an area on the classified image is not classified into any one of the one or more classes. In an exemplary embodiment, segmentation is applied for an image with traffic that results in a classified image. The classified image has outlines on the road pavement, pedestrians, signs, traffic lights as the one or more classes, and if an area of cars in the classified image is not classified, then the scribble-based annotation server 108 enables the user 102 to mark or scribble on the unclassified area that is the area of cars.

The scribble-based annotation server 108 may work with any type of user input such as a point or a scribble or a rectangle or a square-shaped box. In some embodiments, there may be one or more markings or scribblings over the one or more classes.

In some embodiments, one or more scribblings are incorporated when one or more of the labels of a segment of the image may be changed or a subset of pixels in an area may be incorrect. In some embodiments, the segmentation is correct, but the assigned label of the class is incorrect. In some embodiments, one or more labels of objects present in the image is completely missed in the segmentation. For example, if the classified image of the image with traffic has incorrect labels on the outlines of the segment, for example, if the label of the segment traffic lights is mentioned as pavement or if the label of the segment traffic lights is missing or if the traffic lights area is missed out, then the scribbling needs to be incorporated. In some embodiments, the user 102 is allowed to scribble or mark the missed-out area in form of, any of, but not limited to, a point or a scribble or a box that is a rectangle or a square-shaped box.

The scribble-based annotation server 108 assigns a color mask for each scribbled area using the machine learning model 110 after receiving the annotated image that is marked or scribbled by the user 102. The color mask may be the label of one or more classes.

The scribble-based annotation server 108 computes a loss function for a location of pixels based on the color mask assigned on the annotated image using the machine learning model 110. The loss function identifies whether a classified image matches with the received mark or the scribble at scribble locations on the classified image.

The loss function that is obtained during the training of the machine learning model 110 may be minimized by updating pre-defined weights assigned to scribblings over the one or more classes using a backpropagation technique. In some embodiments, modifying the pre-defined weights assigned for each scribbled area based on the loss function is performed using a backpropagation technique. In some embodiments, the gradients are computed for the loss function.

The scribble-based annotation server 108 modifies the pre-defined weights for each scribbled area to match the annotated image and a determined class on the classified image using the loss function by a learning rate. The learning rate determines a speed of change of the weight. The loss may be backpropagated to prevent any over-fitting that may happen by updating all the layers with a high learning rate. The scribble-based annotation server 108 determines whether the annotated image is matched with the determined class on the classified image. The scribble-based annotation server 108 generates the optimized image if the annotated image is matched with the determined class on the classified image. In some embodiments, the received scribblings or markings are incorporated when at least one of (i) each label of the one or more classes is changed, (ii) a subset of pixels in an area is incorrect, (iii) when the class is correct and an assigned label is incorrect, or (iv) all the labels in the classified image are missed.

In some embodiments, the scribble-based annotation server 108 displays the optimized segmented image to the user 102 through the user interface of the user device 104. In some embodiments, the scribble-based annotation server 108 repeats the examining, and generates the new optimized segmented image until a well-optimized segmented image with correct segmentation of one or more detected elements is obtained. In some embodiments, the scribble-based annotation server 108 may optimize the images several times.

Figure 2:
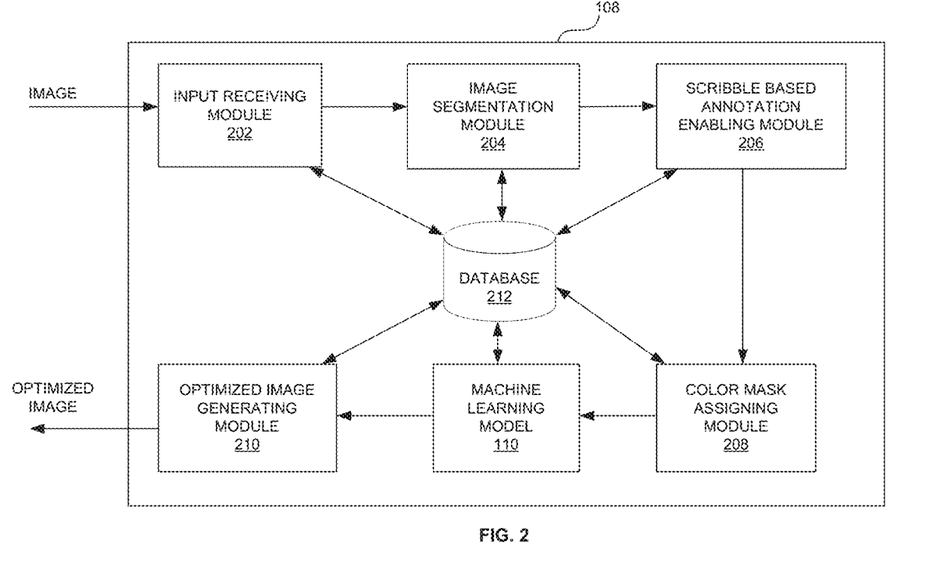
FIG. 2 is a block diagram of a scribble-based annotation server of FIG. 1, according to some embodiments herein.

FIG. 2 is a block diagram of the scribble-based annotation server 108 of FIG. 1 according to some embodiments herein. The block diagram of a scribble-based annotation server 108 includes, an input receiving module 202, an image segmentation module 204, a scribble based annotation enabling module 206, a color mask assigning module 208, an optimized image generating module 210, a machine learning model 110, and a database 212. The input receiving module 202 obtains one or more images as input from the user 102 through the user device 104.

The image segmentation module 204 segments the received image from at least one of a cloud, or the user device 104 to obtain a classified image using one or more classes. Each class is represented with a label. The image segmentation module 204 displays the classified image which specifies the one or more classes on the classified image with outlines through a graphical user interface associated with the user device 104.

The scribble based annotation enabling module 206 enables the user 102 to mark or scribble on the classified image to annotate the one or more classes if an area on the classified image is not classified into any one of the one or more classes. The color mask assigning module 208 assigns a color mask for each scribbled area using the machine learning model 110 after receiving the classified image that is marked and scribbled by the user 102. The color mask may be the label of at least one class. The machine learning model 110 includes an encoder, and a decoder. The encoder extracts one or more feature maps of the received image. The one or more feature maps capture one or more features in the received image using filters at various layers. The decoder recovers a resolution of the one or more feature maps. The feature maps are then used to obtain the classified image showing the one or more classes present. In some embodiments, the one or more feature maps are classified into one or more classes using the machine learning model 110. The machine learning model 110 computes a loss function for a location of pixels based on the color mask located on the classified image. The loss function that is obtained during the training of the machine learning model 110 may be minimized by updating pre-defined weights assigned to scribblings over the one or more classes using a backpropagation technique.

The machine learning model 110 modifies the pre-defined weights for each scribbled area to match the classified image and determined class on the classified image using the loss function by a learning rate. The learning rate determines a speed of change of the weight. The loss may be backpropagated to prevent any over-fitting that may happen by updating all the layers with a high learning rate. The machine learning model 110 determines whether the annotated image is matched with a determined class on the classified image.

The optimized image generating module 210 generates the optimized image if the classified image is matched with the determined class on the classified image.

Figure 3:
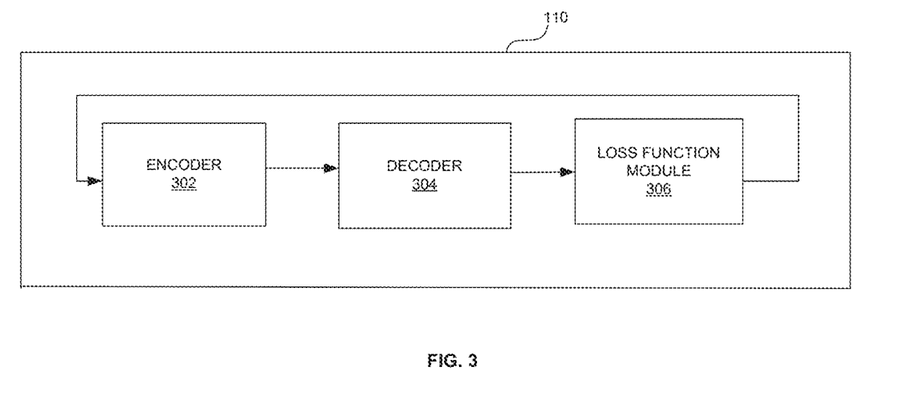
FIG. 3 is a block diagram of a machine learning model of FIG. 1, according to some embodiments herein.

FIG. 3 illustrates exploded view of the machine learning model 110 of FIG. 1 according to some embodiments herein. The machine learning model 110 includes an encoder 302, a decoder 304, and a loss function module 306. The encoder 302 extracts one or more feature maps of the input. The one or more feature maps capture one or more features in the input using filters at various layers. The decoder 304 recovers the feature map resolution of the one or more feature maps. The machine learning model 110 classifies the one or more feature maps into the segmentation of the image containing one or more classes. In some embodiments, the one or more classes may include one or more, but not limited to, some objects may be a road pavement, pedestrians, cars, signs, traffic lights. The machine learning model 110 includes a loss function module. The loss function module 306 computes a loss obtained during the training of the machine learning model 110. The loss obtained during the training of the machine learning model 110 may be minimized by updating pre-defined weights assigned to scribblings over the one or more classes using a backpropagation technique. The loss function may be backpropagated to prevent any over-fitting that may happen by updating all the layers with a high learning rate. The pre-defined weights may be updated according to gradients computed during the backpropagation.

Figure 4:
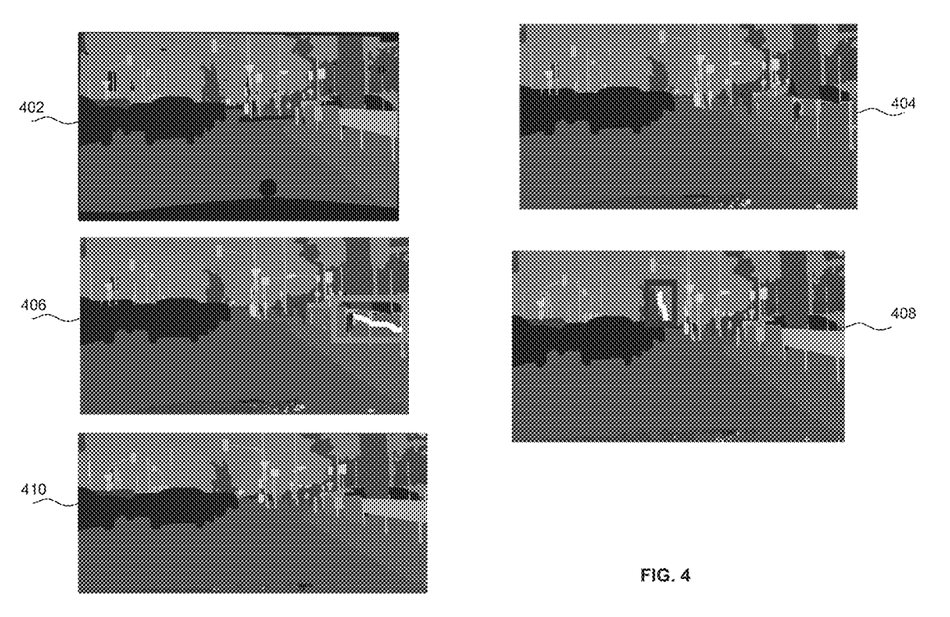
FIG. 4 illustrates an exemplary representation of a segmented image, an optimized segmented image, and scribbled images, according to some embodiments herein.

FIG. 4 illustrates exemplary representations of scribble-based analysis of an image, according to some embodiments herein. The exemplary representations include a ground truth image 402, an initial segmented image 404, a first scribbled image 406, a second scribbled image 408, and an annotated image 410. The ground truth image 402 is the exemplary representation of the initial segmented image 404 after segmentation using scribble-based annotation server 108. The first scribbled image 406 is the exemplary representation of the scribblings or markings provided by the user 102 using the graphical user interface of the user device 104. In some embodiments, the scribblings or markings may be one or more on one or more detected elements. The second scribbled image 406 is the exemplary representation of the scribblings or markings by the user 102 using the graphical user interface of the user device 104 after annotating the first scribbled image 406. The annotated image 410 is the exemplary representation of a final annotated image. The annotated image 410 is provided once the scribbling or marking is completed over the missed-out area of the one or more detected elements.

Figure 5A:
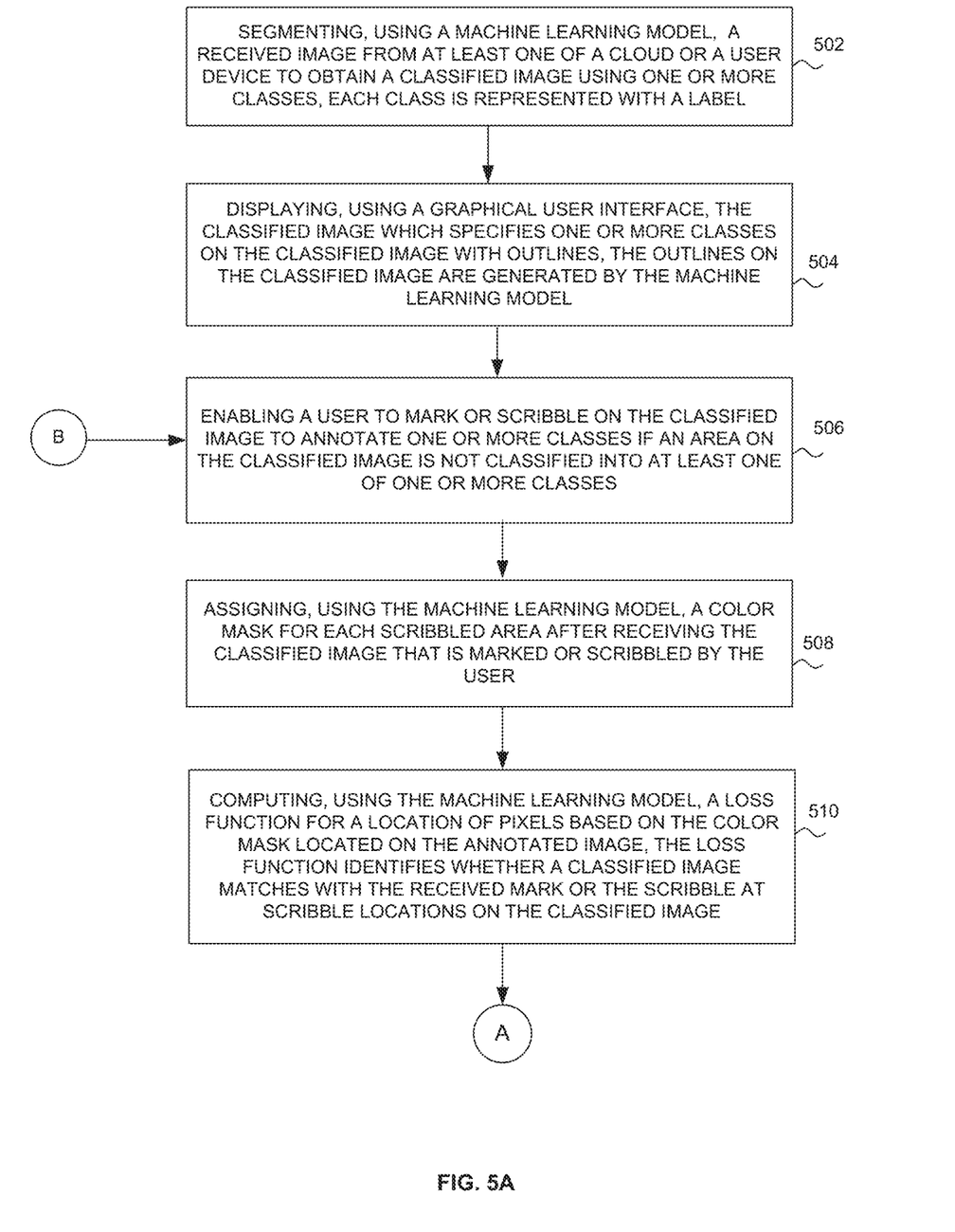
FIGS. 5A & 5B are flow diagrams that illustrate a method for generating an optimized image with scribble-based annotation using a machine learning model, according to some embodiments herein.
Figure 5B:
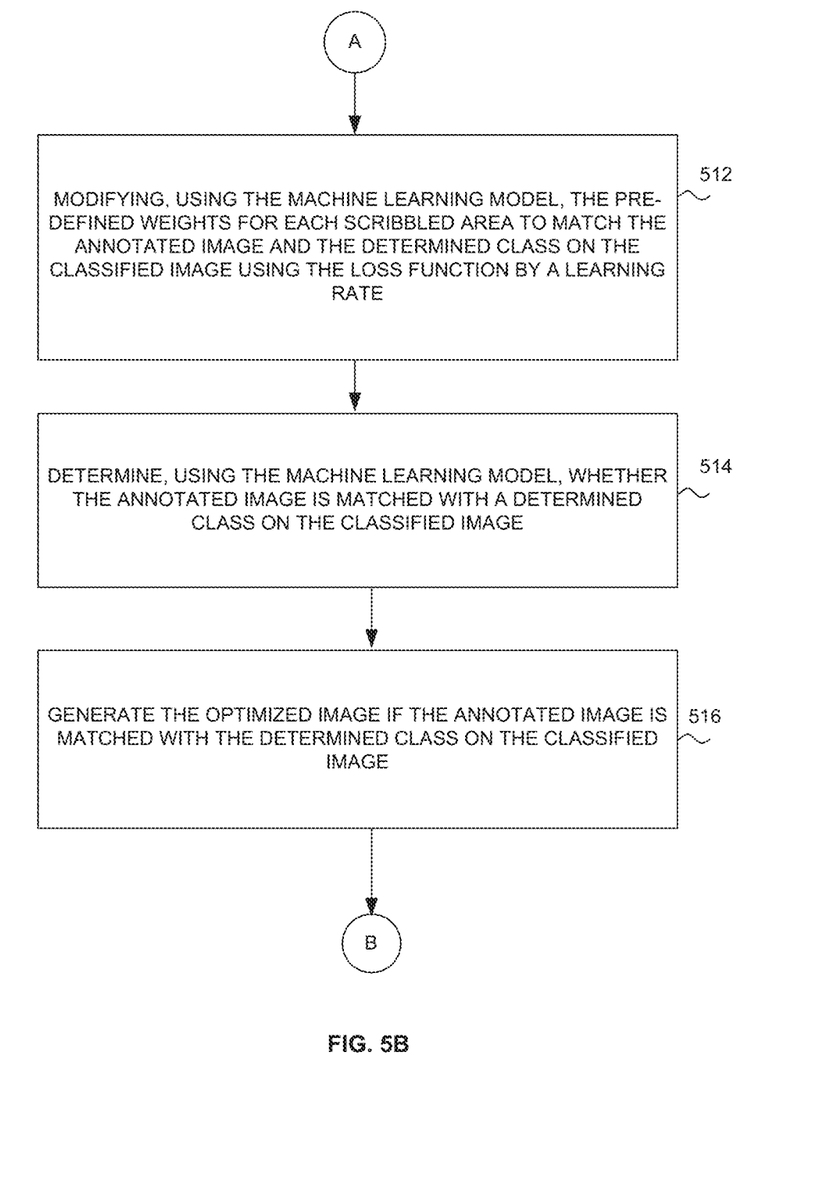

FIGS. 5A & 5B are flow diagrams that illustrate a method for generating an optimized image with scribble-based annotation using a machine learning model, according to some embodiments herein. At step 502, the method includes, segmenting, using the machine learning model, a received image from at least one of a cloud, or a user device to obtain a classified image using one or more classes. Each class is represented with a label. At step 504, the method includes, displaying, using a graphical user interface, the classified image which specifies the one or more classes on the classified image with outlines. The outlines on the classified image are generated by the machine learning model. At step 506, the method includes, enabling a user to mark or scribble on the classified image to annotate the one or more classes if an area on the classified image is not classified into at least one of the one or more classes. At step 508, the method includes, assigning, using the machine learning model, a color mask for each scribbled area after receiving the classified image that is marked or scribbled by the user. At step 510, the method includes, computing, using the machine learning model, a loss function for a location of pixels based on the color mask located on the annotated image. The loss function identifies whether the classified image matches with the received mark or the scribble at scribble locations on the classified image. At step 512, the method includes, modifying, using the machine learning model, the pre-defined weights for each scribbled area to match the annotated image and a determined class on the classified image using the loss function by a learning rate. In some embodiments, the learning rate determines a speed of change of the weight. At step 514, the method includes, determining, using the machine learning model, whether the annotated image is matched with the determined class on the classified image. At step 516, the method includes, generating the optimized image if the annotated image is matched with the determined class on the classified image. In some embodiments, the scribble-based annotation server 108 repeats the examining, and generates the new optimized segmented image until a well-optimized segmented image with correct segmentation of one or more detected elements is obtained. In some embodiments, the scribble-based annotation server 108 may optimize the images several times.

In some embodiments, the received image is segmented into the one or more classes by, (i) extracting, using an encoder, the received image into at least one feature map to capture one or more features, the one or more features are captured using filters; (ii) recovering, using a decoder, a resolution of the at least one feature map to obtain the one or more classes.

In some embodiments, the outlines that are generated on each class of the classified image are validated using the machine learning model through the graphical user interface In some embodiments, the marking or the scribbling over a missed-out area of the classified input is received from an initial outlined class through the graphical user interface In some embodiments, the marking or the scribbling over the missed-out area of one or more classes is received from the optimized image using the graphical user interface and the optimized image is again optimized based on the received scribblings and markings.

In some embodiments, the method further includes, (a) providing optimized images and corresponding (i) weight of each class and (ii) markings and scribblings to the machine learning model as an input data; (b) training the machine learning model using the input data to generate a trained machine learning model to generate the optimized image In some embodiments, the method includes incorporating the received scribblings and markings when at least one of (i) each label of the one or more classes is changed, (ii) a subset of pixels in an area is incorrect, (iii) when the class is correct and an assigned label is incorrect, or (iv) all the labels in the classified image are missed.

In some embodiments, the method includes modifying the pre-defined weights assigned for each scribbled area based on the loss function using a backpropagation technique. In some embodiments, the gradients are computed for the loss function.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 6:
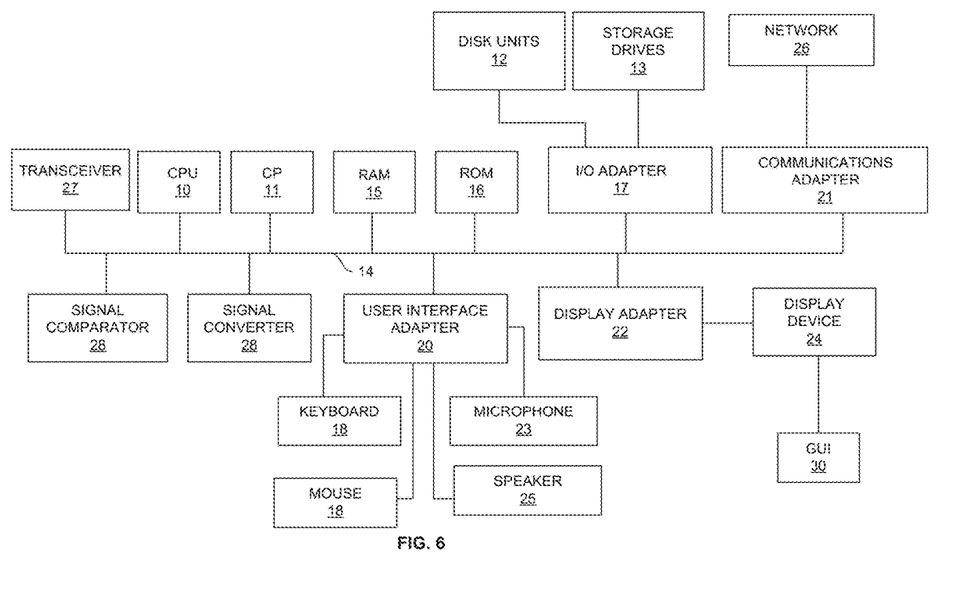
FIG. 6 is a schematic diagram of a computer architecture in accordance with the embodiments herein.

A representative hardware environment for practicing the embodiments herein is depicted in FIG. 6, with reference to FIGS. 1 through 5. This schematic drawing illustrates a hardware configuration of a server 108/a computer system/a user device 104 in accordance with the embodiments herein. The user device 104 includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device 104 can read the inventive instructions on the program storage devices and follow these instructions to execute the methodology of the embodiments herein. The user device 104 further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for generating an optimized image with scribble-based annotation using a machine learning model, comprising:
   segmenting, using the machine learning model, a received image from at least one of a cloud, or a user device to obtain a classified image using a plurality of classes, wherein each class is represented with a label, wherein the plurality of classes are obtained based on predefined weights of the classified image;
   displaying, using a graphical user interface, the classified image which specifies the plurality of classes on the classified image with outlines, wherein the outlines on the classified image are generated by the machine learning model;
   enabling a user to mark or scribble on the classified image to annotate the plurality of classes if an area on the classified image is not classified into at least one of the plurality of classes;
   assigning, using the machine learning model, a color mask for each scribbled area after receiving the classified image that is marked or scribbled by the user;
   computing, using the machine learning model, a loss function for a location of pixels based on the color mask assigned on each scribbled area of the classified image, wherein the loss function identifies whether the classified image matches with the received mark or scribble at the scribbled scribble area on the classified image;
   modifying, using the machine learning model, the predefined weights for each scribbled area to match the classified image and a determined class on the classified image using the loss function by a learning rate, wherein the learning rate determines a speed of change of the weight;
   determining, using the machine learning model, whether the classified image is matched with the determined class on the classified image; and
   generating the optimized image if the classified image is matched with the determined class on the classified image.

2. The processor-implemented method of claim 1, wherein the received image is segmented into the plurality of classes by,
   extracting, using an encoder, the received image into at least one feature map to capture a plurality of features, wherein the plurality of features are captured using filters; and
   recovering, using a decoder, a resolution of the at least one feature map to obtain the plurality of classes.

3. The processor-implemented method of claim 1, wherein the outlines that are generated on each class of the classified image are validated using the machine learning model through the graphical user interface.

4. The processor implemented method of claim 1, wherein the marking or scribbling over the area of the classified image is received from an initial outlined class through the graphical user interface.

5. The processor-implemented method of claim 4, wherein the marking or scribbling over an area of the plurality of classes is received from the optimized image using the graphical user interface, and the optimized image is again optimized based on the received scribbling and marking over the area of the plurality of classes.

6. The processor-implemented method of claim 1, wherein the method further comprises,
providing optimized images and corresponding (i) weight of each class and (ii) scribble and mark to the machine learning model as an input data; and
training the machine learning model using the input data to generate a trained machine learning model to generate the optimized image.

7. The processor-implemented method of claim 1, wherein the method comprises incorporating the received scribbling and marking on the area of the classified image when at least one of (i) each label of the plurality of classes is changed, (ii) a subset of pixels in an area is incorrect, (iii) the class is correct and an assigned label is incorrect, or (iv) all the labels in the classified image are missed.

8. The processor-implemented method of claim 1, wherein the method comprises modifying the pre-defined weights assigned for each scribbled area based on the loss function using a backpropagation technique.

9. One or more non-transitory computer-readable storage medium storing the one or more sequence of instructions, which when executed by the one or more processors, causes to perform a method of generating an optimized image with scribble-based annotation using a machine learning model, said method comprising:
segmenting, using the machine learning model, a received image from at least one of a cloud, or a user device to obtain a classified image using a plurality of classes, wherein each class is represented with a label, wherein the plurality of classes are obtained based on pre-defined weights of the classified image;
displaying, using a graphical user interface, the classified image which specifies the plurality of classes on the classified image with outlines, wherein the outlines on the classified image are generated by the machine learning model;
enabling a user to mark or scribble on the classified image to annotate the plurality of classes if an area on the classified image is not classified into at least one of the plurality of classes;
assigning, using the machine learning model, a color mask for each scribbled area after receiving the classified image that is marked or scribbled by the user;
computing, using the machine learning model, a loss function for a location of pixels based on the color mask assigned on each scribbled area of the classified image, wherein the loss function identifies whether the classified image matches with the received marking or scribbling at the scribbled area on the classified image;
modifying, using the machine learning model, the pre-defined weights for each scribbled area to match the classified image and a determined class on the classified image using the loss function by a learning rate, wherein the learning rate determines a speed of change of the weight;
determining, using the machine learning model, whether the classified image is matched with the determined class on the classified image; and
generating the optimized image if the classified image is matched with the determined class on the classified image.

10. A system for generating an optimized image with scribble-based annotation using a machine learning model, the system comprising:
a device processor; and
a non-transitory computer-readable storage medium storing one or more sequences of instructions, which when executed by the device processor, causes:
segment, using the machine learning model, a received image from at least one of a cloud, or a user device to obtain a classified image using a plurality of classes, wherein each class is represented with a label, wherein the plurality of classes are obtained based on pre-defined weights of the classified image;
display, using a graphical user interface, the classified image which specifies the plurality of classes on the classified image with outlines, wherein the outlines on the classified image are generated by the machine learning model;
enable a user to mark or scribble on the classified image to annotate the plurality of classes if an area on the classified image is not classified into at least one of the plurality of classes;
assign, using the machine learning model, a color mask for each scribbled area after receiving the classified image that is marked or scribbled by the user;
compute, using the machine learning model, a loss function for a location of pixels based on the color mask assigned on each scribbled area of the classified image, wherein the loss function identifies whether the classified image matches with the received marking or scribbling at the scribbled area on the classified image;
modify, using the machine learning model, the pre-defined weights for each scribbled area to match the classified image and a determined class on the classified image using the loss function by a learning rate, wherein the learning rate determines a speed of change of the weight;
determine, using the machine learning model, whether the classified image is matched with the determined class on the classified image; and
generate the optimized image if the classified image is matched with the determined class on the classified image.

11. The system of claim 10, wherein the processor is configured to segment the received image into the plurality of classes by,
extracting, using an encoder, the received image into at least one feature map to capture a plurality of features, wherein the plurality of features are captured using filters;
recovering, using a decoder, a resolution of the at least one feature map to obtain the plurality of classes.

12. The system of claim 10, wherein the processor is configured to validate, using the machine learning model, the outlines that are generated on each class of the classified image through the graphical user interface.

13. The system of claim 10, wherein the processor is configured to receive the marking or scribbling over the area of the classified image from an initial outlined class through the graphical user interface.

14. The system of claim 13, wherein the processor is configured to receive the marking or scribbling over the area of the plurality of classes from the optimized image using the graphical user interface and again optimizes based on the received scribbling and marking over the area of the plurality of classes.

15. The system of claim 10, wherein the processor is configured to
provide optimized images and corresponding (i) weight of each class and (ii) scribble and mark to the machine learning model as an input data;

train the machine learning model using the input data to generate a trained machine learning model to generate the optimized image.

16. The system of claim 10, wherein the processor is configured to incorporate the received scribbling and marking on the area of the classified image when at least one of (i) each label of the plurality of classes is changed, (ii) a subset of pixels in an area is incorrect, (iii) the class is correct and an assigned label is incorrect, or (iv) all the labels in the classified image are missed.

17. The system of claim 10, wherein the processor is configured to modify the predefined weights assigned for each scribbled area based on the loss function using a backpropagation technique.

* * * * *